US008651754B2

(12) United States Patent
Viglione et al.

(10) Patent No.: US 8,651,754 B2
(45) Date of Patent: Feb. 18, 2014

(54) ELECTROMAGNETIC SHUTTER

(75) Inventors: David Viglione, Rochester, NY (US);
Stephen T. Pasquarella, Rochester, NY (US); David Michael Krieger, Rochester, NY (US); Helen Hong Yan, Victor, NY (US)

(73) Assignee: VA, Inc., Rochester, NY (US)

( * ) Notice: Subject to any disclaimer, the term of this patent is extended or adjusted under 35 U.S.C. 154(b) by 0 days.

(21) Appl. No.: 13/524,738

(22) Filed: Jun. 15, 2012

(65) Prior Publication Data

US 2012/0321292 A1  Dec. 20, 2012

Related U.S. Application Data

(60) Provisional application No. 61/497,272, filed on Jun. 15, 2011.

(51) Int. Cl.
*G03B 9/00* (2006.01)
*H04N 5/238* (2006.01)

(52) U.S. Cl.
USPC .......................................... 396/460; 348/363

(58) Field of Classification Search
USPC ........................... 396/452, 458, 460; 348/363
See application file for complete search history.

(56) References Cited

U.S. PATENT DOCUMENTS

| 3,584,561 A * | 6/1971 | Starp .............................. 396/460 |
| 7,513,702 B2 | 4/2009 | Viglione et al. |
| 7,883,280 B2 | 2/2011 | Viglione |

OTHER PUBLICATIONS

Rodenstock Photo Optics, "Rodenstock eShutter—Speed With Perfection; The Revolutionary Electronic Shutter for View Cameras," Sep. 2010, 2 pages.

* cited by examiner

*Primary Examiner* — Rochelle-Ann J Blackman
(74) *Attorney, Agent, or Firm* — Lee & Hayes, PLLC

(57) ABSTRACT

A shutter includes a driver ring, a plurality of shutter blades coupled to the drive ring such that movement of the drive ring transitions the plurality of shutter blades between an open position exposing a central aperture of the shutter, and a closed position blocking the central aperture, and a first stop and a second stop movable relative to the first stop. At least one of the first and second stops limits travel of the shutter blades.

27 Claims, 6 Drawing Sheets

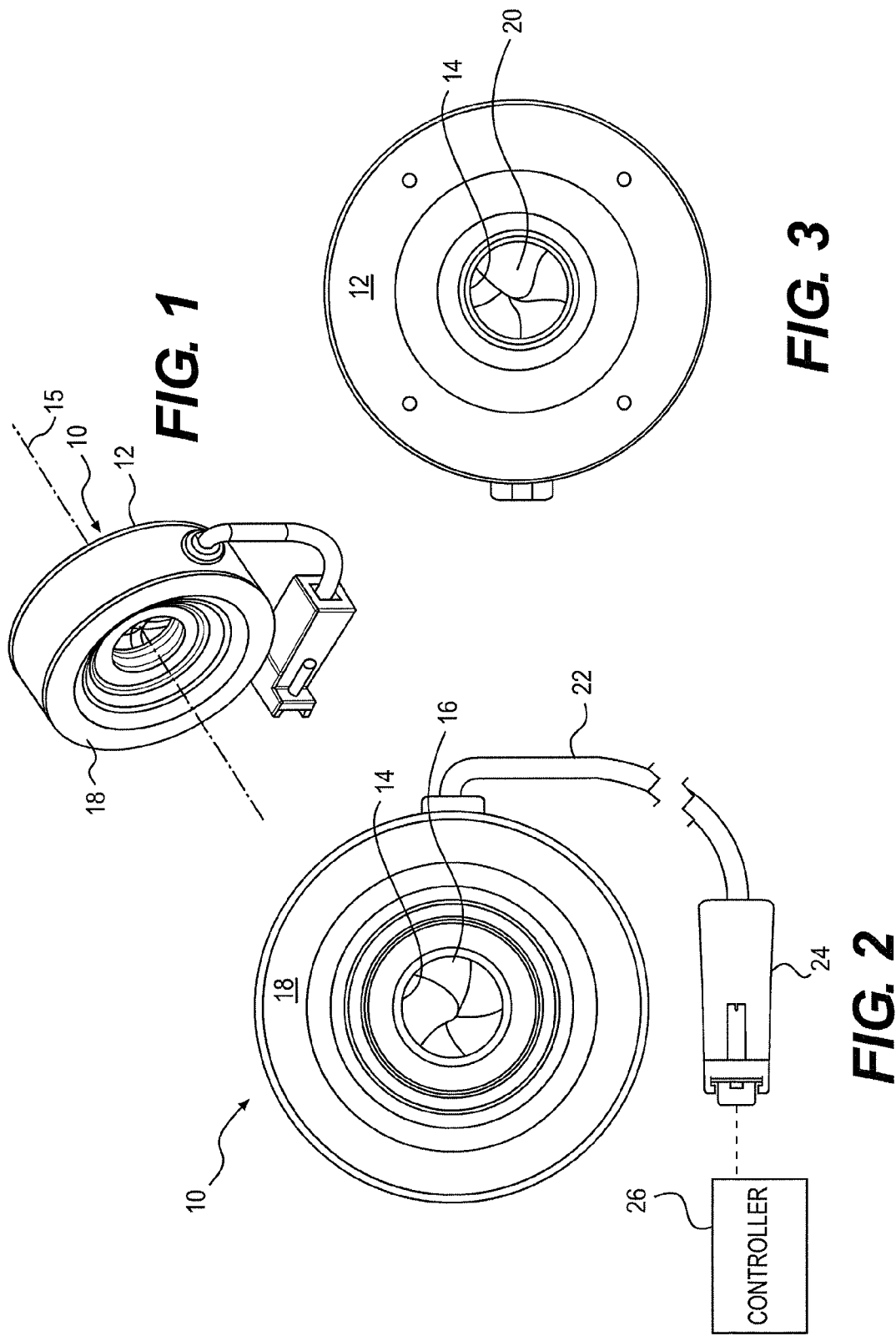

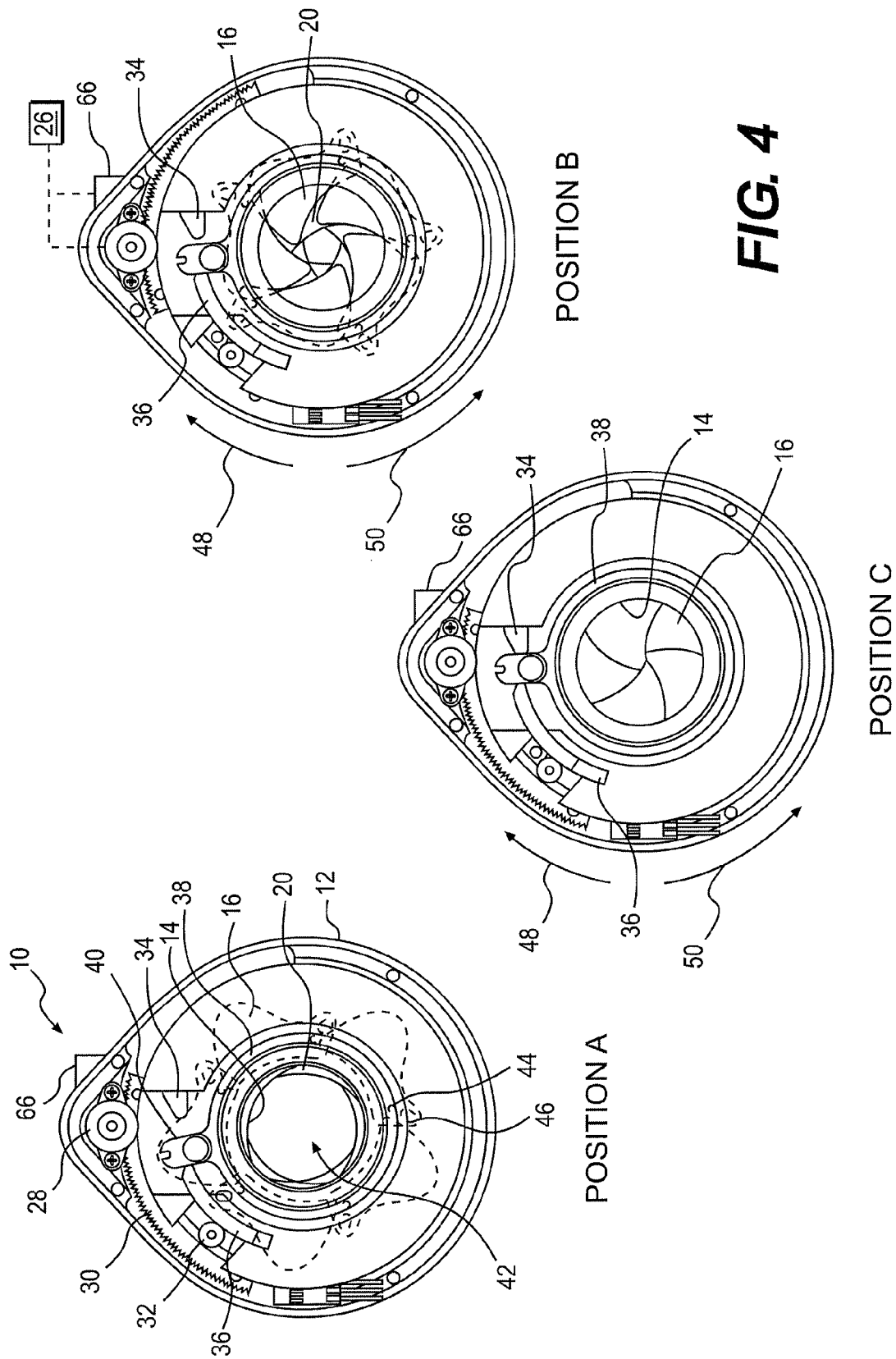

ELECTROMAGNETIC SHUTTER

CROSS-REFERENCE TO RELATED APPLICATIONS

This application claims the benefit of U.S. Provisional Application No. 61/497,272, filed Jun. 15, 2011, the contents of which are expressly incorporated herein by reference.

STATEMENT REGARDING FEDERALLY SPONSORED RESEARCH OR DEVELOPMENT

Not applicable.

REFERENCE TO A "SEQUENCE LISTING"

Not applicable.

BACKGROUND OF THE INVENTION

1. Field of the Invention

The present disclosure relates generally to shutter assemblies and, more particularly, to shutters relying on electromagnetic, spring, and/or biasing forces to open and/or close a plurality of shutter blades.

2. Description of Related Art

Electromagnetic shutter assemblies are commonly used in photographic and other applications requiring a relative rapid shutter exposure pulse. Such shutter assemblies typically employ a number of shutter blades that are movable to expose a central aperture of the assembly. For example, such shutter blades can be movable between an open position exposing the central aperture of the shutter, and a closed position blocking the central aperture. In the open position, light may be allowed to pass through the central aperture to reach a lens and/or film utilized with a corresponding photographic device such as a camera. Once a desired exposure time has elapsed, the shutter blades may then be moved to the closed position, thereby blocking light from passing through the central aperture.

Such shutter blades are typically coupled to one or more drive components configured to rapidly and controllably transition the blades between the open and closed positions. Such components may include, for example, a drive ring and an actuator coupled to the drive ring. In such an arrangement, the drive ring may be rotatably mounted within, for example, a base plate of the shutter assembly, and the shutter blades may be coupled to both the drive ring and the base plate. For example, rotation of the drive ring may cause each of the shutter blades to pivot about a respective pin formed in the base plate. In such a shutter assembly, the drive ring may also include a number of pins slidably disposed within respective slots formed in the shutter blades. Thus, rotating the drive ring may cause the pins of the drive ring to slide in the respective slots of the shutter blades, thereby causing desired movement of the shutter blades. Generally, a linear electric motor is used to rotate the drive ring. When activated, the motor may move, for example, a lever arm, gear, and/or other combination of linkages, thereby causing the drive ring to rotate the shutter blades to an open position. In exemplary shutters, such a motor can then be deactivated, and a spring or other biasing member may cause counter-rotation of the drive ring in order to close the shutter blades.

Known shutters, however, typically suffer from several undesirable deficiencies. For example, the operating characteristics of certain cameras and/or the exposure requirements for different photographic applications may require that the size of a shutter aperture formed by the plurality of shutter blades be adjustable. Known shutters, however, may not allow for such adjustability.

Moreover, to reduce wear on the different shutter components, it may be desirable to damp the movement of such components during operation of the shutter. However, known shutters may not be configured to adjust the position of such dampers in response to changes in shutter aperture size. In addition, most known shutters may utilize a large number of complicated linkages and/or control strategies to adjust the desired size of the shutter aperture.

Since such complicated structures and/or methods of control may increase the size, cost, and complexity of known shutters, and may also result in reduced reliability, it may be desirable to reduce and/or eliminate such complexities in favor of a more streamlined shutter design. In particular, it may be desirable to reduce the number of mechanical components utilized to set and/or change the size of the shutter aperture formed by the shutter blades. Such a reduction in components and/or such a simplification in control strategy may reduce the overall cost of the shutter and may improve operational characteristics such as reliability and component wear.

Moreover, known shutters may not be capable of determining the exact position of one or more of the shutter blades during travel between the open and closed positions. For example, known shutters typically sense the position of one or more shutter blades at either the beginning or the end of travel. With only limited information regarding the position of the shutter blades during travel, it may difficult for known shutters to accurately control shutter blade movement or to facilitate highly precise modifications in, for example, opening speed, closing speed, and/or shutter aperture size.

In addition, while some shutters may utilize a set of iris blades to form an adjustable iris opening of the shutter, and a set of shutter blades configured to open and close behind the iris blades, the exposure time of such shutters is limited by the travel of the shutter blades behind the iris blades. For example, while the iris blades may be set for a relatively small iris aperture size, the shutter blades in such shutters may still be required to rotate between the fully open position (forming a shutter aperture much larger than the iris aperture) and the fully closed position (blocking light from passing through the relatively small iris aperture). Thus, since the shutter blades in such shutters travel well beyond the iris opening, such shutters may not be appropriate in applications requiring relatively short dwell times.

The exemplary embodiments of the present disclosure are aimed at addressing one or more of the deficiencies discussed above.

BRIEF SUMMARY OF THE INVENTION

In an exemplary embodiment of the present disclosure, a shutter includes a plurality of shutter blades movable between an open position exposing a central aperture of the shutter, and a closed position blocking the aperture. The shutter also includes a first stop and a second stop movable in relation to the first stop. At least one of the first and second stops limits travel of the shutter blades.

In such an exemplary embodiment, the plurality of shutter blades is coupled to the drive rings such that movement of the drive ring transitions the plurality of shutter blades between an open position and a closed position. In such an exemplary embodiment, a portion of the drive ring impinges upon one of the first and second stops to limit travel of the plurality of shutter blades.

In additional exemplary embodiments, the first stop is movable relative to the second stop, at least one of the first and second stops includes a damper, and the shutter further includes a plurality of iris blades forming an iris aperture, the iris blades being in communication with an actuation assembly configured to change the size of the iris aperture.

In such exemplary embodiments, the actuation assembly includes an iris ring and an actuator configured to rotate the iris ring. The second stop is coupled to the iris ring such that movement of the iris blade results in movement of the second stop.

In addition, such shutters also include a sensor coupled to the iris ring such that movement of the iris blades results in movement of the sensor.

In additional exemplary embodiments, the second stop is in communication with the actuation assembly such that movement of the iris blades results in movement of the second stop.

In further exemplary embodiments, the shutter also includes a sensor coupled to the actuation assembly such that movement of the iris blades results in movement of the sensor.

In addition, exposing the central aperture of the shutter results in movement of the second stop relative to the first stop.

In another exemplary embodiment of the present disclosure, a method of controlling a shutter includes rotating a plurality of iris blades to form an iris aperture. Said exemplary method includes moving a first stop relative to a second stop in response to rotation of the plurality of iris blades. Such an exemplary method also includes rotating a plurality of shutter blades between an open position exposing the iris aperture and a closed position blocking the iris aperture. In such an exemplary embodiment, at least one of the first and second stops limits travel of the shutter blades.

In a further exemplary embodiment, the second stop comprises a cam rotatable relative to the first stop. In such an exemplary embodiment, the second stop comprises a rotatable cam, the drive ring impacting the cam in one of the open and closed positions.

In still another exemplary embodiment, wherein the cam comprises a damper configured to damp movement of the drive ring upon impact with the cam. In said exemplary embodiment, the shutter further including an additional actuation assembly configured to controllably rotate the cam.

In such an exemplary embodiment, rotating the plurality of shutter blades includes rotating a drive ring between a first position abutting the first stop and a second position abutting the second stop. In addition, rotating the plurality of iris blades includes rotating an iris ring to which the iris blades are coupled, and rotating the iris ring causes the corresponding movement of the first stop. Moreover, moving the first stop includes activating an actuation assembly coupled to the plurality of iris blades.

In another exemplary embodiment of the present disclosure, a shutter includes a drive ring having a detent, and a plurality of shutter blades coupled to the drive ring. Rotation of the drive ring causes the plurality of shutter blades to transition between an open position in which the plurality of shutter blades forms a shutter aperture and a closed position in which the plurality of shutter blades blocks light from passing through the shutter. The shutter also includes a rotatable cam, the drive ring being biased such that the detent contacts the cam in one of the open and closed positions.

In such an exemplary embodiment, rotation of the cam changes the size of the shutter aperture formed by the plurality of shutter blades, and the shutter includes a first actuator coupled to the cam and a separate second actuator coupled to the drive ring.

The shutter also includes a permanent magnet imparting a bias force to the drive ring, and a stop disposed opposite the cam. The detent contacts the stop in the other of the open and closed positions. In such an exemplary embodiment, the drive ring is biased such that the detent contacts the cam in the open position, the detent impacting the stop in the closed position against a bias force applied to the drive ring.

In still another exemplary embodiment, at least one of the stop and the cam damp movement of the drive ring upon contact with the detent.

In further exemplary embodiments, drive ring is biased such that the detent contacts the stop in the open position, the detent impacting the cam in the closed position against a biased force applied to the drive ring, and the shutter includes a spring member imparting a bias force to the drive ring.

In another exemplary embodiment of the present disclosure, a method of controlling a shutter includes rotating a cam to a desired position relative to a drive ring detent and rotating the drive ring between a first position in which the detent contacts the cam and a second position in which the detent contacts a stop disposed opposite the cam. The method also includes transitioning a plurality of shutter blades coupled to the drive ring between an open position in which the plurality of shutter blades forms a shutter aperture and a closed position in which the plurality of shutter blades blocks light from passing through the shutter. In such a method, the desired position of the cam determines the size of the shutter aperture formed by the plurality of shutter blades.

Such an exemplary method also includes changing the size of the shutter aperture by rotating the cam, transitioning the plurality of shutter blades between the open position and the closed position while keeping the cam in the desired position, and applying a bias force to the drive ring such that the detent contacts the cam in one of the open and closed positions. The exemplary embodiment further includes damping movement of the drive ring with the cam.

In another exemplary embodiment of the present disclosure, a shutter includes a plurality of shutter blades movable between an open position exposing a central aperture of the shutter and a closed position blocking the aperture. The shutter also includes an array of sensors aligned linearly relative to at least one shutter blade of the plurality of shutter blades, the array of sensors sequentially detecting a position of the at least one shutter blade as the at least one shutter blade moves between the open and closed positions.

In such an exemplary embodiment, the array of sensors includes an array of proximity sensors, and the shutter further includes an actuator operably connected to the plurality of shutter blades and a controller operably connected to the actuator. The array of sensors sending a signal to the controller including information indicative of the detected position. In addition, the actuator reverses a direction of travel of the plurality of shutter blades based on the detected position and the controller reverses a current sent to the actuator based on the detected position. Moreover, the array of sensors extends along substantially an entire path of travel of the at least one shutter blade.

In another exemplary embodiment of the present disclosure, a method of controlling a shutter includes rotating a plurality of shutter blades in a first direction. The method also includes sequentially detecting a position of at least one shutter blade of the plurality of shutter blades along a linear sensing path as the at least one shutter blade rotates in the first direction.

In such an exemplary embodiment, rotating the plurality of shutter blades in the first direction exposes a central aperture of the shutter. Such an exemplary method also includes rotating the plurality of shutter blades in a second direction, opposite the first direction, in response to the detected position, and sequentially detecting the position of the at least one shutter blade with a plurality of sensors disposed along the linear sensing path. In such an exemplary embodiment, the plurality of shutter blades is rotatable between an open position and a closed position, and the method further includes changing the direction in which the plurality of shutter blades rotates while the plurality of shutter blades is disposed between the open and closed positions. Such an exemplary method also includes changing the direction in which the plurality of shutter blades rotates in response to the detected position.

In a further exemplary embodiment of the present disclosure, a method of controlling a shutter includes opening a plurality of iris blades to form an iris aperture of the shutter and rotating a plurality of shutter blades in a first direction to form a shutter aperture larger than the iris aperture. The plurality of shutter blades form the shutter aperture at an intermediate position between an open position and a closed position. The method also includes rotating the plurality of shutter blades in a second direction opposite the first direction from the intermediate position to the closed position.

In such an exemplary embodiment, rotating the plurality of shutter blades in the second direction includes sending a control signal to a shutter blade actuator before the plurality of shutter blades reaches the open position. In such an exemplary embodiment, rotating the plurality of shutter blades in the second direction includes reversing an electric current sent to the actuator. Moreover, at least one shutter blade of the plurality of shutter blades impacts a damper at the intermediate position.

In another exemplary embodiment of the present disclosure, a shutter includes a plurality of shutter blades coupled to a drive ring such that rotation of the drive ring transitions the plurality of shutter blades between an open position and a closed position. The shutter also includes a voice coil carried by the drive ring between a pair of permanent magnets, wherein energizing the voice coil causes rotation of the drive ring.

In such an exemplary embodiment, the voice coil travels along an accurate path, and the drive ring further includes a plurality of delrin pins, each pin engaging a slot in a respective shutter blade of the plurality of shutter blades. Such an exemplary shutter further includes a controller and a flexible lead operably connecting the controller to the voice coil. The flexible lead directs an electric current to the voice coil.

In another exemplary embodiment, the drive ring includes a detent, and the shutter includes a first stop and a second stop disposed opposite the first stop. In such an embodiment, the detent impacts the first stop when the plurality of shutter blades is in the open position and impacts the second stop when the plurality of shutter blades is in the closed position.

In a further exemplary embodiment of the present disclosure, a method of controlling a shutter includes rotating a first plurality of shutter blades to a closed position while rotating a second plurality of shutter blades, disposed facing the first plurality of shutter blades, to an open position. In such an embodiment, rotating the second plurality of shutter blades to the open position exposes a central aperture of the shutter for a first portion of a desired exposure period. In addition, rotating the first plurality of shutter blades to the closed position exposes the central aperture of the shutter for a remainder of the exposure period.

Such an exemplary embodiment also includes lengthening the exposure period by at least one of delaying rotating the first plurality of shutter blades to the closed position and expediting rotating the second plurality of shutter blades to the open position. The method also includes increasing a maximum size of a shutter aperture formed by the first and second pluralities of shutter blades by at least one of delaying rotating the first plurality of shutter blades to the closed position and expediting rotating the second plurality of shutter blades to the open position.

BRIEF DESCRIPTION OF THE SEVERAL VIEWS OF THE DRAWING(S)

FIG. 1 is an isometric view of a shutter according to an exemplary embodiment of the present disclosure.

FIG. 2 is a plan view of the front of the shutter shown in FIG. 1.

FIG. 3 is a plan view of the back of the shutter shown in FIG. 1.

FIG. 4 illustrates several views of an exemplary shutter with portions removed. with portions removed.

DETAILED DESCRIPTION OF THE INVENTION

Figure 5:
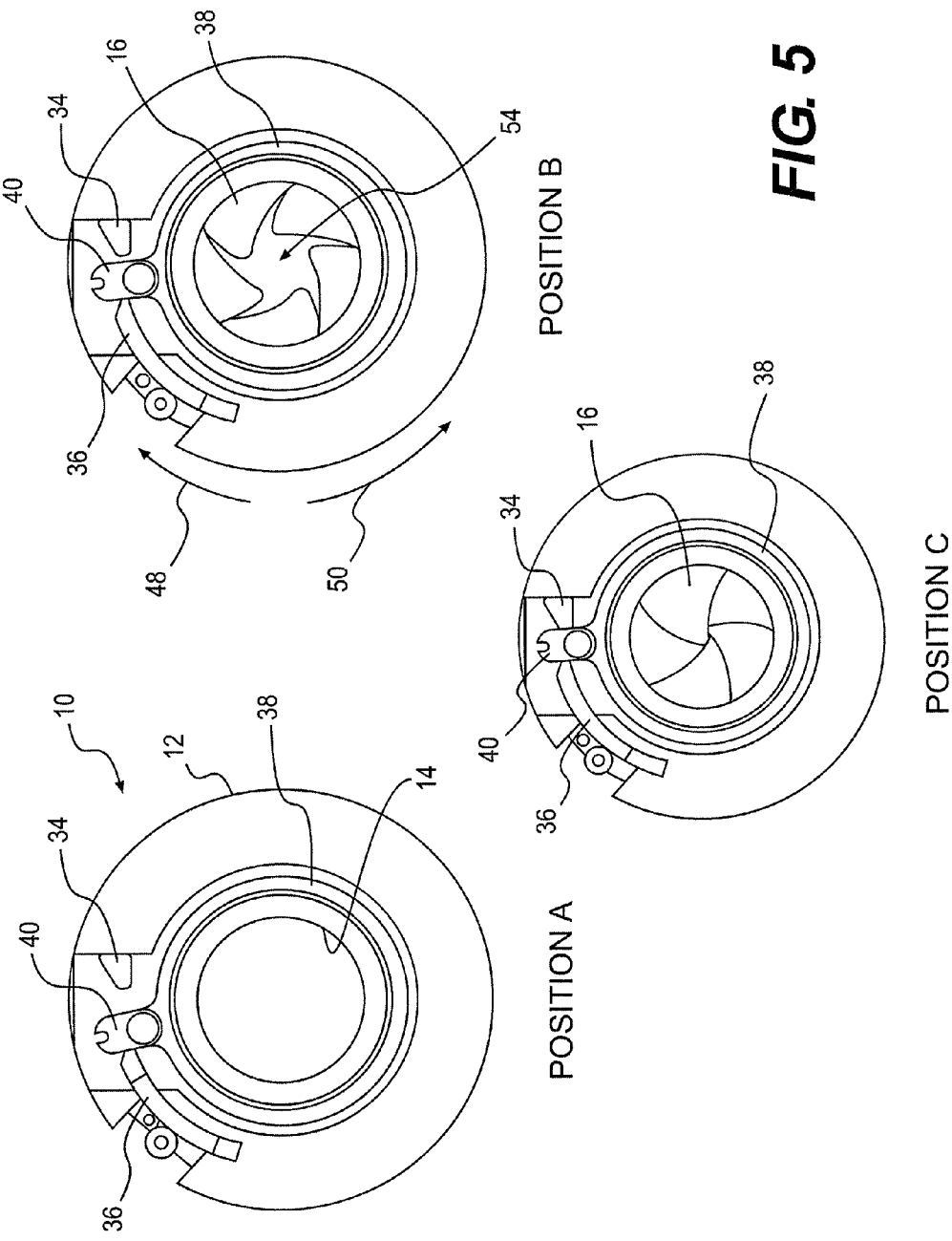
FIG. 5 illustrates several views of an additional exemplary shutter

FIG. 1 illustrates an exemplary shutter 10 having a base plate 12 and a cover 18 attached to the base plate 12. The shutter 10 may be used in any photographic, scientific, calibration, and/or other application requiring one or more cycles of opening and closing of a central opening or aperture.

As shown in FIGS. 2 and 3, the base plate 12 may define a central aperture 14 of the shutter 10. The central aperture 14 may be exposed and/or blocked by respectively opening and/or closing a plurality of shutter blades 16. The shutter 10 may include two or more shutter blades 16, and such shutter blades 16 may be configured to pivot and/or rotate across the central aperture 14. For example, as shown in FIG. 2, the shutter blades 16 may be pivoted across the central aperture 14 to achieve a closed position in which the shutter blades 16 block light from passing through the central aperture 14. The shutter blades 16 may be transitioned from this closed position to an open position shown in, for example, Position A of FIGS. 6 and 7, in which the shutter blades 16 permit light to pass through the central aperture 14.

Figure 6:
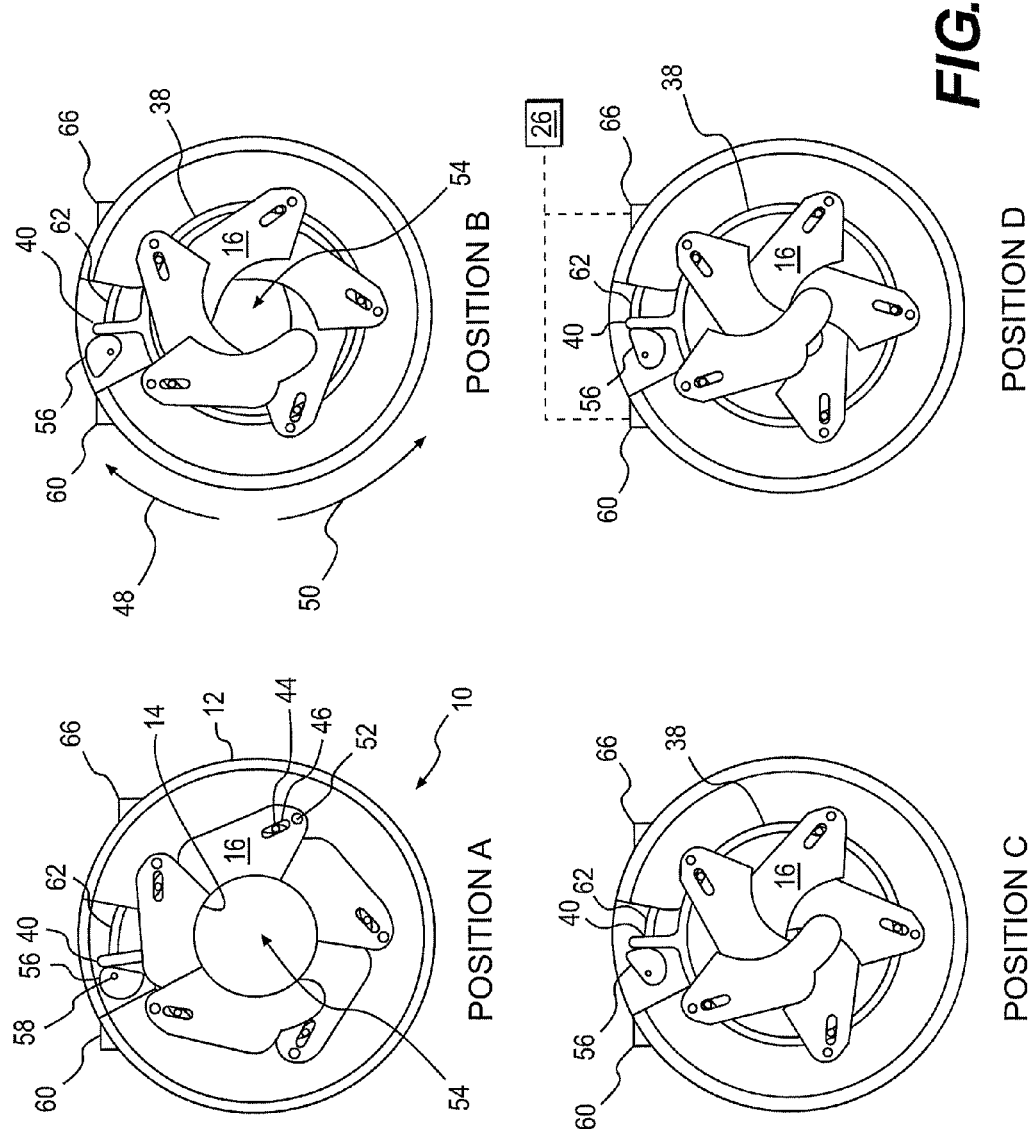
FIG. 6 illustrates several views of a further exemplary shutter with portions removed.

As shown in, for example, FIGS. 4 and 6, in an exemplary embodiment one or more of the shutter blades 16 may be operably connected to a drive ring 38. The drive ring 38 may be rotatable relative to the base plate 12. For example, the drive ring 38 may be disposed within a slot, channel, groove, and/or other like structure defined by the base plate 12, and may be rotatably coupled thereto. The drive ring 38 may be, for example, disposed substantially around and/or otherwise concentric with the central aperture 14. For example, the drive ring 38 may define an opening that aligns with the central aperture 14. Although FIG. 3 illustrates a circular central aperture 14, in further exemplary embodiments the central aperture 14 may have any other useful shape, size, and/or other configuration. For example, the central aperture 14 may be substantially square, substantially rectangular, substantially oval-shaped, and/or any other shape useful in shutter applications.

Components of the shutter 10 may include, for example, one or more pins, bearings, slots, orifices, and/or other like structures pivotably and/or rotatably coupling the shutter blades 16 to the base plate 12 and/or the drive ring 38, and assisting the shutter blades 16 in pivoting between the open and closed positions. As illustrated in FIG. 4, in an exemplary embodiment, each shutter blade 16 may include one or more pins 44. The pins 44 may, for example, extend substantially perpendicularly from the respective shutter blades 16. For example, each shutter blade 16 may include a pair of pins 44, wherein one of the shutter blade pins 44 extends into a corresponding cam slot 46 formed in the base plate 12 and the other of the shutter blade pins 44 extends into a corresponding hole and/or substantially cylindrical orifice formed in the drive ring 38. With this arrangement, rotation of the drive ring 38 to and fro about the central aperture 14 and/or about a central axis 15 of the shutter 10 may cause the shutter blades 14 to pivot between the open and closed positions described herein. In additional exemplary embodiments, the drive ring 38 may include one or more pins, and each of the drive ring pins may be disposed within a slot, hole, and/or orifice defined by a respective one of the shutter blades 16. In such exemplary embodiments, the base plate 12 may also include one or more pins, and each of the base plate pins may be disposed within a corresponding slot defined by a respective one of the shutter blades 16 to facilitate transition of the shutter blades 16 between the open and closed positions. To facilitate motion of the shutter blades 16, each of the shutter blades 16 may be pivotably, rotatably, slideably, and/or otherwise movably coupled to, for example, the base plate 12 and/or any other non-moving component of the shutter 10.

Figure 7:
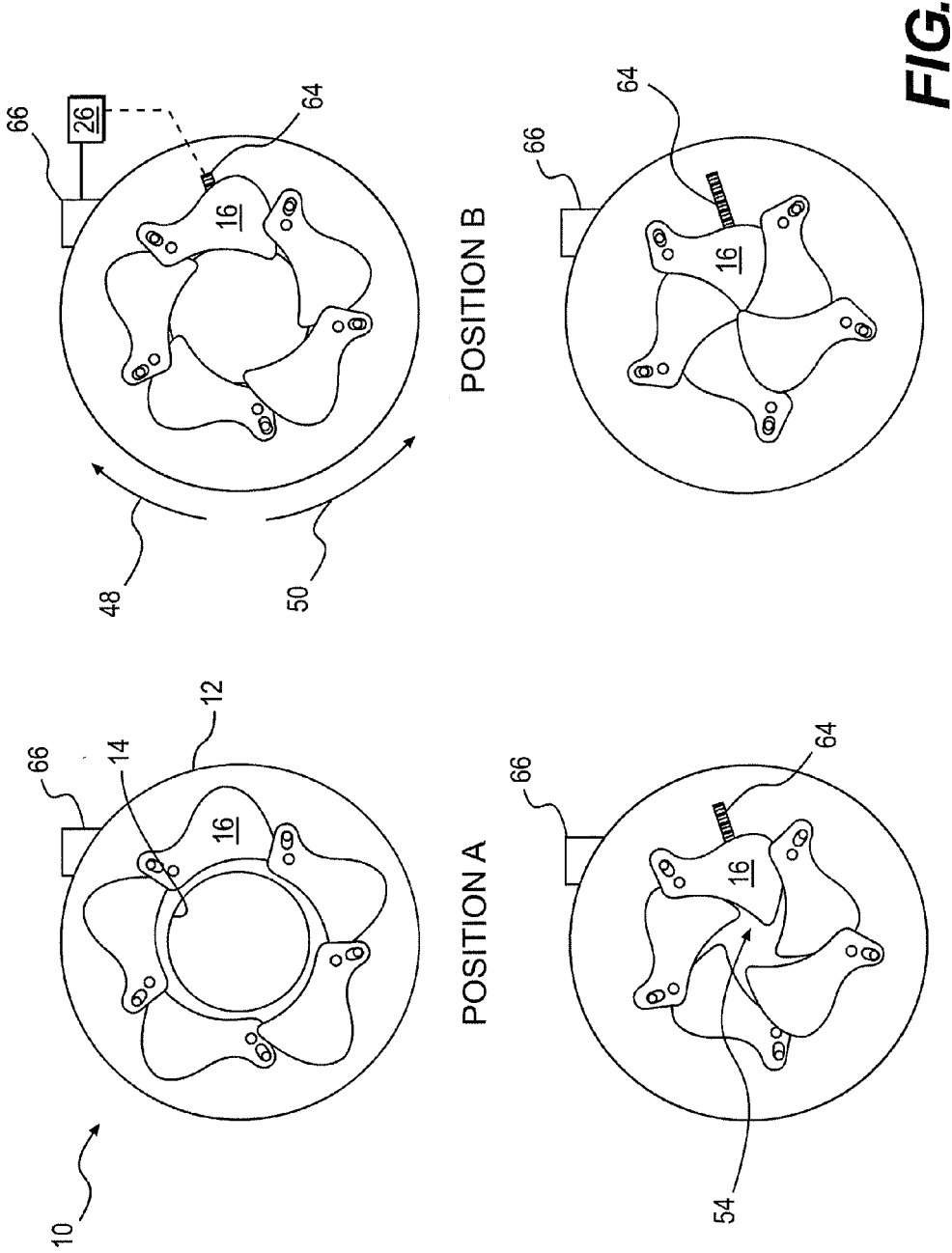
FIG. 7 illustrates several views of still another exemplary shutter with portions removed.

As shown in FIGS. 4, 6, and 7, the shutter 10 may also include an actuator 66 configured to actuate, rotate, and/or otherwise move the drive ring 38 and/or shutter blades 16. Such an actuator 66 may include, for example, one or more stepper motors or other like electronic motors configured to rotate the drive ring 38 in a clockwise and/or counter-clockwise direction about the central aperture 14. In such an exemplary embodiment, the actuator 66 may further include one or more gears, linkages, arms, shafts, and/or other like structure operably connecting the motor to the drive ring 38 to facilitate movement of the drive ring 38 in response to activation of the motor.

Alternatively and/or in addition to the actuator 66 components described herein, the actuator 66 may include one or more solenoids configured to impart motion to the drive ring 38 and/or the shutter blades 16. For example, one or more permanent magnets may be coupled to the drive ring 38, and such magnets may be substantially aligned with corresponding solenoids of the actuator 66. For example, each magnet may be spaced, positioned, and/or otherwise aligned relative to a respective solenoid such that movement of the magnet relative to a core of the solenoid may transition the shutter blades 16 between the open and closed position. For example, as described in co-owned U.S. Pat. No. 7,513,702, the entire disclosure of which is hereby incorporated herein by reference, when the solenoids are not energized, the permanent magnets may be magnetically attracted to a respective core of one of the solenoids. To open such shutters, the solenoids may be energized to repel and/or attract the respective permanent magnets.

Thus, the repelling forces and/or attractive forces between the respective solenoids and permanent magnets may propel the drive ring 38 in either the clockwise direction of arrow 48 (FIG. 4) or the counter-clockwise direction of arrow 50. In an exemplary embodiment, the drive ring 38 and/or shutter blades 16 of such an exemplary shutter 10 may be stable, biased, and/or locked in the closed position when the one or more solenoids are de-energized. Alternatively, the actuator 66 of the shutter 10 may be configured such that the drive ring 38 and/or shutter blades 16 are stable, biased, and/or locked in the open position when the one or more solenoids are de-energized.

In a further exemplary embodiment, the shutter 10 and/or actuator 66 may comprise one or more of the linkages, actuators, solenoids, and/or other components disclosed in co-owned U.S. Pat. No. 7,883,280, the entire disclosure of which is hereby incorporated herein by reference.

The one or more actuators of the shutter 10 may be energized, de-energized, and/or otherwise controlled to facilitate desired movement of the shutter blades 16, the desired movement of the iris blades 20, and/or other operations and/or functions of the shutter 10. Accordingly, the one or more controllable components of the shutter 10 may be operably connected to a controller 26. As shown in FIG. 2, the shutter 10 may be connected to the controller 26 via one or more cables 22 having any of a variety of known connectors 24 suitable for transmitting control signals, data, and/or information between the controller 26 and components of the shutter 10. The controller 26 may be, for example, any computer, processor, server, and/or other like device configured to process information received from the shutter 10 and to control the operations of the shutter 10. For example, the controller 26 may be a control component of a camera or other photographic device to which the shutter 10 is connected for use. In an exemplary embodiment, the controller 26 may direct a current and/or a voltage to the one or more actuators of the shutter 10. The controller 26 may be connected to a power source (not shown), and may energize the actuators of the shutter 10 to facilitate movement of, for example, the iris blades 20 and/or the shutter blades 16. For example, the controller 26 may operate to energize one or more motors of such actuators to assist in transitioning the iris blades 20 and/or the shutter blades 16 between the open and closed positions. In still a further exemplary embodiment, the controller 26 may energize one or more solenoids of such actuators to induce desired movement of one or more corresponding permanent magnets associated with the drive ring 38, shutter blades 16, and/or iris blades.

With reference to FIG. 4, in an exemplary embodiment, the drive ring 38 may be substantially annular and/or otherwise disc-shaped, and may define one or more detents 40 extending therefrom. An exemplary detent 40 may be formed from the drive ring 38 or may be rigidly coupled thereto by any known means. The detent 40 may be, for example, a tongue, extension, shoulder, or tab that is shaped, sized, positioned, and/or otherwise configured to abut, impact, and/or otherwise contact one or more components of the shutter 10 during use. For example, the detent 40 may contact one or more stops, dampers, bumpers, shoulders, and/or other components of the shutter 10 to assist in limiting motion of the drive ring 38 and/or the shutter blades 16 at the open and closed positions. In such exemplary embodiments, one or more stops, dampers, bumpers, shoulders, and/or other like components may be formed by and/or mounted to the detent 40. Alternatively, such components may be formed by and/or mounted to the base plate 12 or other non-moving components of the shutter 10 to assist in limiting motion and/or damping movement of the drive ring 38 and/or shutter blades 16.

The detent 40 may also form a convenient surface or platform on which to mount one or more biasing members 62 (FIG. 6) such as springs, coils, arms, linkages, permanent magnets, electromagnets, and/or other like components employed by, for example, the actuators discussed herein. For instance, one or more permanent magnets may be mounted to the detent 40 to assist in rotating and/or otherwise controllably moving the drive ring 38. In addition, one or more springs, arms, linkages, and/or other like structures may be coupled to the detent 40 to assist in biasing the drive ring 38 toward or away from a desired position relative to, for example, the base plate 12 or other shutter components.

In addition to and/or in place of any of the shutter components discussed herein, an exemplary shutter 10 may further include one or more stops positioned, for example, about the central aperture 14. For example, the shutter 10 may include a first stop 34 and second stop 36, and the stops 34, 36 may be disposed proximate to, for example, the detent 40. In an exemplary embodiment, at least one of the stops 34, 36 may be mounted to, for example, the base plate 12 or any other stationary components of the shutter 10. At least one of the stops 34, 36 may be positioned such that the drive ring 38 and/or at least one of the shutter blades 16 may abut, impact, and/or otherwise contact the at least one stop at the open position and/or the closed position. For example, as shown in FIG. 4, the stops 34, 36 may be positioned such that the detent 40 may contact one of the stops 34, 36 in the open position and the other of the stops 34, 36 in the closed position. In this way, at least one of the first and second stops 34, 36 may limit travel of the shutter blades 16 and/or the drive ring 38 during operation of the shutter 10.

In an exemplary embodiment, at least one of the stops 34, 36 may be movable relative to the base plate 12, and/or other stationary components of the shutter 10. For example, as illustrated in FIG. 4, the first stop 34 may be mounted in a substantially stationary position on the base plate 12, and the second stop 36 may be movable in relation to the first stop 34. In still further exemplary embodiments, each of the stops 34, 36 may be movable relative to one another. For example, the first stop 34 may be movable relative to the second stop 36, and the second stop 36 may be movable relative to the first stop 34. Such an exemplary configuration may enlarge the range of motion of the drive ring 38 and/or shutter blades 16. Such a configuration may also provide a wider array of open and closed position configurations and/or control. In such an exemplary embodiment, each of the stops 34, 36 may be coupled and/or otherwise connected to, for example, one or more components of the drive rings, linkages, and/or actuators discussed herein to facilitate movement thereof.

With continued reference to FIG. 4, at least one of the stops 34, 36 may comprise a bumper, a damper, and/or other like component configured to damp the motion of a moving component of the shutter 10 upon being impacted by such a component. As such, the function and/or operation of the dampers 34, 36 described herein may be different than other known dampers, such as friction dampers, of the prior art which apply a damping force to moving components by remaining in constant physical and/or frictional contact with such components. To account for this difference in function and/or performance, the first and second stops 34, 36 may be made from materials, such as rubber, plastics, polymers, and/or other like materials, that are less brittle and more malleable than known friction damper materials. Such known friction damper materials typically include, for example, metals, alloys, ceramics, composites, and/or other like materials.

In an exemplary embodiment, at least one of the stops 34, 36 may be coupled to a moving component of the shutter 10 to damp movement of such components. For example, at least one of the stops 34, 36 may be coupled to a moving component of one or more of the actuators described herein or, alternatively, one or more of the stops 34, 36 may be disposed on and/or otherwise coupled to the drive ring 38 and/or at least one of the shutter blades 16 to assist in damping movement and/or otherwise limiting travel thereof.

In addition to the actuator 66 discussed above, the shutter 10 may include an iris actuator 28, a linkage 30 coupled to the actuator 28, and one or more gears 32 coupled to the linkage 30. The iris actuator 28 may be structurally similar to and/or the same as the actuator 66. In an exemplary embodiment, the iris actuator 28 may include a stepper motor, or other like electric motor configured to controllably induce movement of one or more shutter components. For example, the iris actuator 28 may include a drive gear, a drive shaft, and/or other like rotating components, and such components may be employed to assist in at least partially opening and/or partially closing, for example, the iris aperture 42 formed by the one or more iris blades 20. The iris actuator 28 may be configured to position the iris blades 20 in the open positions shown in Position A and Position C of FIG. 4, as well as the closed position shown in Position D of FIG. 4. The iris actuator 28 may also be configured to position the iris blades 20 in any other partially opened position, such as that shown in Position B. The iris actuator 28 may be configured to maintain the iris blades 20 in any desired position and may enable the user to continuously vary the diameter, surface area, and/or any other size or dimension of the iris aperture 42.

In an exemplary embodiment, the iris actuator 28 may be highly tunable and/or otherwise controllable such that the user may accurately obtain an iris aperture 42 of a desired size or dimension. For example, one or more of the moving components of the iris actuator 28 may be capable of between approximately 10 and approximately 50 steps and/or positions per revolution, and in an exemplary embodiment, the iris blades 20 of the shutter 10 may have, for example, approximately 170 steps between the open position shown in Positions A and C, and the closed position shown in Position D.

The linkage 30 may be any shaft, arm, lever, and/or other structural component configured to transfer rotational motion of one or more iris actuator components to other driven components of the shutter 10. For example, as shown in FIG. 4, the linkage 30 may be a substantially arc-shaped or bowed arm engaged with the iris actuator 28. The linkage 30 may be driven by the iris actuator 28 in either the clockwise direction of arrow 48 or the counter-clockwise direction of arrow 50. In an exemplary embodiment, the linkage 30 may be an extension of an iris ring that is structurally similar to the drive ring 38. The linkage 30 may also be movably connected to the base plate 12 and/or other components of the shutter 10 to guide motion of the linkage 30 along a desired path upon activation of the iris actuator 28. For example, the linkage 30 may be disposed within a channel or groove defined by the base plate 12 to guide the motion thereof. Alternatively, the linkage 30 may define one or more slots and/or cam surfaces, and such surfaces may engage and/or otherwise communicate with, for example, one or more cams or pins of the base plate 12 so as to guide movement of the linkage 30 when acted upon by the iris actuator 28. As shown in FIG. 4, the linkage 30 may define a plurality of teeth, grooves, and/or other like structures to facilitate a driven relationship with the iris actuator 28.

Although the gear 32 is shown in FIG. 4 as being operably connected between the linkage 30 and the second stop 36 to assist in moving the second stop 36 in response to movement of the linkage 30, it is understood that in additional exemplary embodiments, one or more sprockets, arms, linkages, additional gears, and/or other known components may be used in addition to and/or in place of the gear 32 to transmit motion from the linkage 30 to the second stop 36. The gear 32 may define a plurality of grooves or teeth engaging the linkage 30 as it moves in response to, for example, activation of the iris actuator 28. Such structures may also mesh with and/or otherwise communicate with corresponding structures or components of the second stop 36 such that the second stop 36 may move in response to, for example, rotation of the gear 32. In still further exemplary embodiments, the shutter 10 may include an additional actuator coupled to the stop 36, and configured to control and/or modify the position of the stop 36 relative to the detent 40 and the stop 34. In such exemplary embodiments, the linkage 30 may be an extension of the iris ring discussed above and the gear 32 may be omitted.

In an exemplary embodiment, energizing the iris actuator 28 may cause the linkage 30 to move in the counter-clockwise direction of arrow 50, thereby causing the gear 32 to rotate in the counter-clockwise direction of arrow 50 and the second stop 36 to move in the clockwise direction of arrow 48. Such activation of the iris actuator 28 may cause the iris blades 20 to transition from the open position to the closed position, or any other relative position. Accordingly, movement of the plurality of iris blades 20 by the iris actuator 28 and/or other components of the actuation assemblies described herein may cause movement of the stop 36 relative to the stop 34. As described above, at least one of the stops 34, 36 may limit travel of the drive ring 38 and/or the shutter blades 16. Due to the stops 34, 36 limiting travel of the shutter blades 16, the shutter blades 16 may be capable of transitioning between the open and closed positions in less than approximately 10 milliseconds. In an exemplary embodiment, the shutter blades 16 may make such a transition in less than approximately 2 milliseconds.

As mentioned above, an exemplary shutter 10 may include an iris ring (not shown), similar to the drive ring 38, movably coupled to the iris actuator 28. In such an exemplary embodiment, the iris actuator 28 may be configured to rotate the iris ring, and one or more of the iris blades 20 may be movably connected to the iris ring in a way similar to the connection between the shutter blades 16 and the drive ring 38. In such an exemplary embodiment, the iris actuator 28 may be configured to rotate the iris ring in the clockwise direction of arrow 48 and the counter-clockwise direction of arrow 50, thereby transitioning the iris blades 20 between the open and closed positions described herein. Such an exemplary shutter 10 may further include any number of gears, linkages, pins, shafts, and/or other known structures to facilitate movement of the iris ring in response to activation of the iris actuator 28. In addition, in such an exemplary embodiment, at least one of the stops 34, 36 may be coupled to the iris ring such that movement of the iris blades 20 and/or the iris ring may result in movement of the at least one stop 34, 36 coupled to the iris ring. For example, the second stop 36 may be connected to, mounted on, and/or otherwise coupled to such an iris ring, and rotation of the iris ring may cause commensurate movement of the second stop 36 toward or away from a stationary first stop 34. Alternatively, in exemplary embodiments in which the second stop 36 is coupled to an additional dedicated actuator, such an actuator impart movement to the second stop 36 that is commensurate in scope, rate, and/or direction with the movement of the actuator 28, iris ring, and/or linkage 30.

As will be described in greater detail below, the shutter 10 may also include one or more sensors configured to assist in detecting the position of the shutter blades 16, iris blades 20, drive ring 38, and/or any other moving parts of the shutter 10. Information regarding such detected positions may assist in controlling movement of one or more of these moving parts. For example, such sensors may send signals, information, and/or data to the controller 26, thereby forming part of a feedback control loop for controlling operation of the shutter 10. In an exemplary embodiment, one or more such sensors may be mounted on, and/or otherwise coupled to the iris ring described above, such that movement of the iris blades 20 and/or the iris ring may result in commensurate movement of the sensor. Such a sensor may also be coupled to any other moving component of the shutter 10 such that movement of the iris blades 20 may result in commensurate movement of the sensor. In such exemplary embodiments, the sensor may include, for example, a proximity sensor, a Hall effect sensor, and/or any other type of motion detection device known in the art. Such, sensors may often include one or more magnets, photo eyes, triggers, flags and/or other like components. At least one of such components, may be coupled to, for example, at least one iris blade 20, the iris ring, the linkage 30, and/or any other moving components of the actuation assembly or of the shutter 10, while a second or additional component of such a sensor may be mounted to a stationary component of the shutter 10, such as the base plate 12.

During operation, the iris blades 20 of such an exemplary shutter 10 may be rotated to form the iris aperture 42, and movement of the plurality of iris blades 20 may cause movement of, for example, at least one of the stops 34, 36 relative to the other stop. The shutter blades 16 may then be rotated between an open position exposing the iris aperture 42 formed by the iris blades 20, and a closed position blocking the iris aperture 42. In such an exemplary embodiment, the drive ring 38 may be biased in the direction of the at least one moving stop 36, 34 such that the drive ring 38 may maintain contact with the moving stop while the shutter blades 16 are in the open position. For example, as shown in Position A of FIG. 4, the detent 40 of the drive ring 38 may maintain contact with the second stop 36 once the iris blades 20 have been rotated to an open position forming the iris aperture 42. The size of the iris aperture 42 may be adjusted by moving the second stop 36 in the direction of arrow 48, as shown in Position B of FIG. 4.

When moving the second stop 36 in the direction of arrow 48, the detent 40 may remain in contact with the second stop 36. Since the radial position of the drive ring 38 may, in this way, be adjusted by the shutter components coupled to the iris actuator 28, rotation of the iris ring and/or of the second stop 36 may cause corresponding movement of the shutter blades 16.

For example, as shown in Position B of FIG. 4, moving the iris blades 20 to a partially closed position may cause the shutter blades 16 to achieve a corresponding partially closed configuration due to the detent 40 and/or other portions of the drive ring 38 maintaining a biased abutting relationship with the second stop 36. The shutter blades 16 may then be rotated between the open and closed positions by activating an additional actuation assembly to, for example, rotate the drive ring 38 between a first position abutting the stop 36 and a second position abutting the stop 34. In this way, second stop 36 may be positioned to minimize the travel of the shutter blades 16 and may prohibit movement of the shutter blades 16 from opening substantially beyond the size of the iris aperture 42. This reduction in shutter blade travel may assist in increasing the speed with which the shutter aperture 54 (FIG. 5) may be opened and closed. As shown in Position C of FIG. 4, in an exemplary embodiment, the second stop 36 may be moved in the clockwise direction of arrow 48 such that the detent 40 of the drive ring 38 may be immobilized between the first stop 34 and the second stop 36. When so positioned, the shutter blades 16 may be locked in the closed position.

FIG. 5 further illustrates the exemplary embodiment of the shutter 10 shown in FIG. 4, in which moving the second stop 36 in the clockwise direction of arrow 48 may reduce the travel of the drive ring 38 and, thus, the travel of the shutter blades 16. Conversely, moving the second stop 36 in the counter-clockwise direction of arrow 50 may increase the span or range of rotation available to the drive ring 38, thereby expanding the travel of the drive ring 38 and of the shutter blade 16.

In addition to and/or in place of the shutter components discussed herein, an exemplary embodiment of the shutter 10 may include a rotatable cam coupled to the base plate 12. As shown in FIG. 6, such a cam 56 may be movably coupled to the base plate 12 via one or more keys 58, pins, shafts, bearings, and/or other like components. Such components may assist the user in rotating and/or otherwise desirably positioning the cam 56 radially relative to the base plate 12 during use of the shutter 10. For example, the cam 56 may be operably connected to a cam actuator 60, and the cam actuator 60 may be controlled to rotate the cam 56 in a clockwise and/or counter-clockwise direction during use of the shutter 10. The cam actuator 60 may be structurally similar to and/or the same as the iris actuator 28, and/or any of the other actuators discussed herein. In addition, the cam 56 may be coupled to the cam actuator 60 using any gears, linkages, arms, shafts, bearings, and/or other like components.

As shown in FIG. 6, in such an exemplary embodiment, the drive ring 38 may include a detent 40, and the drive ring 38 and/or the detent 40 may be biased such that the detent 40 contacts the cam 56 in one of the open and closed positions of the shutter blades 16. As described above, the shutter blades 16 illustrated in FIG. 6 may be coupled to the drive ring 38 such that rotation of the drive ring 38 causes the plurality of shutter blades 16 to transition between an open position (Position A of FIG. 6) in which the shutter blades 16 form the shutter aperture 54 proximate and/or about the central aperture 14 of the shutter 10, and a closed position (Position D of FIG. 6) in which the shutter blades 16 block light from passing through the central aperture 14 and/or the shutter 10.

In such an exemplary embodiment, the detent 40 may be biased against the cam 56 by one or more springs, solenoids, and/or any other of the biasing members 62 described herein. Thus, rotating the cam 56 may change the size of the shutter aperture 54 formed by the shutter blades 16. In such an exemplary embodiment, the drive ring 38 and/or the plurality of shutter blades 16 may be operably coupled to a second actuator 66 that is separate from the cam actuator 60. In this way, the shutter blades 16 may perform the functions of the iris blades 20 discussed herein, and in such an exemplary embodiment, such iris blades 20 may be omitted.

For example, the cam 56 may be positioned radially such that the shutter aperture 54 formed by the shutter blades 16 may perform the same function of the iris aperture 42 (FIG. 4). The cam 56 may also serve as a movable stop and/or damper, as described above with regard to the second stop 36 of FIG. 4. The exemplary shutter 10 illustrated in FIG. 6 may also include an additional stop and/or damper disposed opposite the cam 56, and the detent 40 may contact such an additional stop and/or damper in one of the open and closed positions. For example, as shown in FIG. 6, the drive ring 38 may be biased such that the detent 40 contacts the cam 56 when the shutter blades 16 are in the open position (Position A). The shutter aperture 54 may be tuned and/or otherwise adjusted by rotating the cam 56 as desired. The shutter blades 16 may then be fired closed by energizing the actuator 66 coupled to the drive ring 38 and/or the shutter blades 16. When fired closed, the drive ring 38 may rotate, for example, in the clockwise direction of arrow 48, and the detent 40 and/or other parts or components of the drive ring 38 may impact the stop disposed opposite the cam 56 in the closed position against a bias force applied to the drive ring 38 and/or the detent 40.

In such an exemplary embodiment, the drive ring 38 may overcome such a biasing force applied by the biasing member 62 to transition the shutter blades 16 from the open position to the closed position. The additional stop opposite the cam 56 may limit the rotation of the drive ring 38 in the clockwise direction, and the actuator 66 may hold the shutter blades 16 in the closed position for any desired period of time. The shutter blades 16 may then return to the open position in which the detent 40 again contacts the cam 56. Such a return to the open position may be achieved solely through the biasing force applied by the biasing member 62. Alternatively, and/or in addition, the actuator 66 may also be used to rotate the drive ring 38 in the counterclockwise direction of arrow 50 to return the shutter blades 16 to the open position. At least a portion of the cam 56 and/or the additional stop may be made from one or more hard plastics, rubber, polymers, or other like materials to assist in damping movement of the drive ring 38 upon impact therewith.

In an additional exemplary embodiment, the biasing member 62 may bias the drive ring 38 and/or the detent 40 in the clockwise direction of arrow 48. In such an embodiment, the detent 40 may remain in contact with the second stop (not shown in FIG. 6) when the shutter blades 16 are in the open position. The shutter blades 16 may then be fired closed by rotating the drive ring 38 in the counter-clockwise direction of arrow 50 against the biasing force applied by the biasing member 62. In such an exemplary embodiment, the drive ring 38 may rotate until contacting the cam 56, and the radial position of the cam 56 may determine the size of the shutter aperture 54 formed by the shutter blades 16 in the open position. As described above, the shutter blades 16 may be returned to the closed position via the biasing force applied by the biasing member 62 and/or by activation of the actuator 66.

In each of the disclosed embodiments, the radial position of the cam 56 relative to the base plate 12 and/or detent 40 may determine the size, surface area, shape, diameter, and/or other configurations of the shutter aperture 54 formed by the shutter blades 16, and any of these characteristics may be desirably increased, decreased, modified, and/or otherwise controlled by rotating the cam 56. As described above, the cam 56 may be a moveable stop and may be desirably positioned by using, for example, a cam actuator 60. In addition, the drive ring 38 may be controlled using a separate additional actuator 66 coupled thereto, and the shutter blades 16 may be transitioned between the open position and the closed position while the cam 56 is kept stationary in a desired position corresponding to, for example, the desired shutter aperture size. Such an exemplary shutter configuration may eliminate the need for a separate set of iris blades 20.

As described above, an exemplary shutter 10 may include one or more sensors aligned, positioned, and/or otherwise configured to detect a position of at least one of the shutter blades 16 as the at least one shutter blade 16 moves between the open and closed positions. For example, as shown in FIG. 7, a shutter 10 may include an array of sensors 64 positioned proximate at least one of the shutter blades 16. The sensors 64 may comprise, for example, one or more proximity sensors, Hall effect sensors, and/or any of the other sensors described above or known in the art. The sensors 64 may be aligned linearly relative to at least one of the shutter blades 16. For example, the array of sensors 64 may lie along a substantially linear path, and at least one of the shutter blades 16 may pivot such that the shutter blade 16 passes across, over, and/or through the linear sensor path. For example, the array of sensors 64 may be disposed along a linear path intersecting a center point of the shutter aperture 54. Such a path may be substantially perpendicular to, for example, the central axis 15 (FIG. 1) of the shutter 10. In such an exemplary embodiment, the array of sensors 64 may extend along, for example, the base plate 12 in a substantially linear radial direction. Accordingly, the array of sensors 64 may extend along substantially an entire path of travel of at least one of the pivoting shutter blades 16. In an alternative exemplary embodiment, the array of sensors 64 may be disposed along an arcuate and/or otherwise curved path. For example, the sensors 64 may be aligned along a curved path that corresponds to the curved path of travel of at least one of the pivoting shutter blades 16.

In an exemplary embodiment, the sensors 64 may be configured to sequentially detect a position of at least one of the shutter blades 16 as the shutter blade 16 moves between the open and closed positions. For example, a sensor 64 disposed closest to the outer perimeter of the base plate 12 may be configured to detect the position of a trailing edge of a shutter blade 16 when the shutter blade 16 is disposed in the open position (Position A) shown in FIG. 7. A flag, permanent magnet, sensor component, and/or any other like structure may be embedded within and/or coupled to the shutter blade 16 to facilitate such position detection. When the shutter blades 16 are in the open position, at least one of the shutter blades may be disposed proximate and/or over the sensor 64 disposed closest to the base plate perimeter. As the shutter blade 16 moves from the open position to, for example, an exemplary position (Position B) intermediate the open and closed positions, a second sensor disposed adjacent to the first sensor may detect the position of the trailing edge of the shutter blade 16. The array of sensors 64 may continue to detect, for example, the position of the trailing edge of the shutter blade 16 sequentially along the array until the shutter blades 16 come to rest in, for example, the closed position (Position D) shown in FIG. 7. Although detection of the trailing edge is described herein, it is understood that the sensors 64 may detect any portion of the shutter blade 16 as it travels between the open and closed positions.

The exemplary shutter 10 shown in FIG. 7 may also include an actuator 66 operably connected to the plurality of shutter blades 16. For example, the actuator 66 may comprise, for example, the drive ring actuator 66 described above with regard to FIG. 6. It is understood that the drive ring 38 has been omitted from FIG. 7 for clarity. Such an actuator 66 may be configured to assist in transitioning the shutter blades 16 between the open and closed positions. Such an exemplary shutter 10 may further include a controller 26 operably connected to the actuator 66. In such an exemplary embodiment, the array of sensors 64 may also be operably connected to, for example, the controller 26. The sensors 64 may, thus, be configured to send signals, pulses, and/or other information corresponding to, for example, the location of one or more of the shutter blades 16 to the controller 26. The information sent to the controller 26 by the sensors may be indicative of the detected position of at least one of the shutter blades 16, and the controller 26 may be configured to utilize such information in controlling, for example, the opening and closing of the shutter blades 16, the speed with which the shutter blades 16 travel between the open and closed positions, the timing of, for example, the opening and/or closing of the shutter blades 16, and/or any other known operations of the shutter 10.

For example, the controller 26 may be configured to control the actuator 66 to reverse a direction of travel of the plurality of shutter blades 16 based on the detected position of one or more of the shutter blades 16. For example, the shutter blades 16 may rotate in the clockwise direction of arrow 48 toward the closed position. The sensors 64 may sequentially detect the rotation and/or position of at least one of the shutter blades, and upon sending a signal indicative of such position during rotation, to the controllers 26, the controller 26 may control the actuator 66 to reverse the direction of travel of the shutter blades 16 from clockwise to the counter-clockwise direction of arrow 50. Thus, during operation, the plurality of shutter blades 16 may be rotated in a first direction and then in a second direction opposite the first direction, in response to the detected position of at least one of the shutter blades 16.

To facilitate such a reversal, the controller 26 may be configured to reverse a current sent to the actuator 66 and/or reverse a polarity of a voltage sent to the actuator 66. The controller 26 may reverse such a current and/or polarity at any time during use of the shutter 10. For example, the controller 26 may reverse the current and/or the polarity of the voltage while the shutter blades 16 are in motion and/or while the shutter blades 16 are at rest in either of the open or closed positions.

In additional exemplary embodiments, the controller 26 may be configured to send one or more pulses of electrical current to the actuator 66 based on the signals and/or other information received from the sensors 64. Such pulses may assist in accelerating and/or decelerating movement of the drive ring 38 and/or the shutter blades 16. In addition, and/or alternatively, the controller 26 may reduce an electrical signal sent to the shutter blade actuator 66 in order to, for example, magnetically slow the movement of the plurality of shutter blades 16 while the shutter blades 16 are in transit between the open and closed positions. Such control strategies and methods are explained in greater detail in co-owned U.S. patent application Ser. No. 12/046,958, filed Mar. 12, 2008, the entire disclosure of which is hereby incorporated herein by reference. Any of the methods or strategies disclosed in U.S. patent application Ser. No. 12/046,958 may be employed to control the operation of the exemplary shutter 10 discussed herein.

Figure 8:
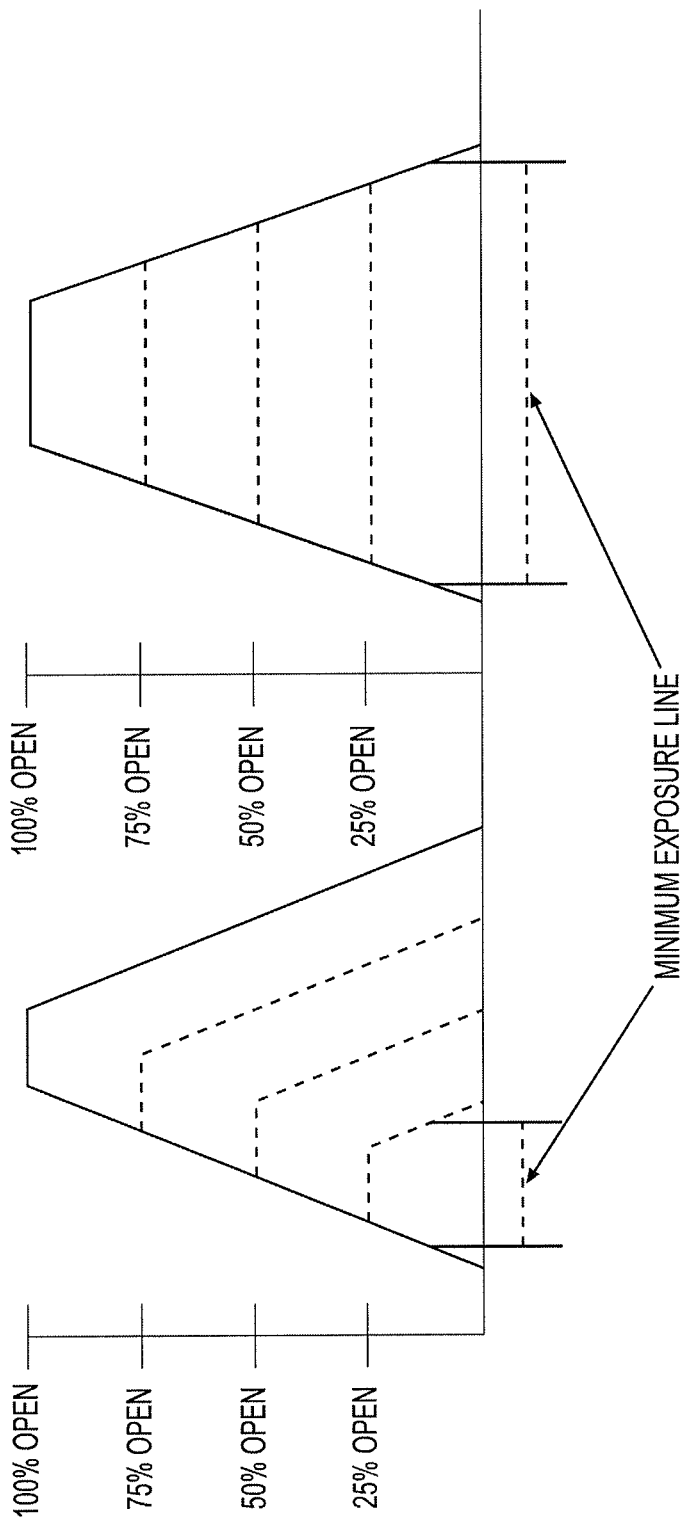
FIG. 8 illustrates several shutter exposure diagrams according to exemplary embodiments of the present disclosure.

FIG. 8 illustrates the exposure time of exemplary shutters including both a plurality of shutter blades 16 and a plurality of iris blades 20. For example, as illustrated by the graph on the right hand side of FIG. 8, when the iris blades 20 of exemplary shutters 10 form an iris aperture 42 that is relatively large such as, for example, commensurate in size with the central aperture 14 of the shutter 10, the shutter blades 16 may be required to substantially fully open in order to expose the iris aperture 42, thereby allowing light to pass therethrough. Otherwise, if the shutter blades 16 are not opened far enough, the shutter aperture 54 formed thereby may be smaller than the iris aperture 42, and the iris aperture 42 may, thus, not be exposed.

Alternatively, when the iris blades 20 are controlled to form an iris opening 42 that is substantially smaller than, for example, the central aperture 14, transitioning the shutter blades 16 to the open position may result in a minimum exposure time for the shutter 10 that is, perhaps, longer than desired. For example, once the iris blades 20 are opened to form a relatively small iris opening 42, rotating the plurality of shutter blades 16 to transition from the closed position to the open position may result in the shutter blades 16 traveling well beyond the iris aperture 42. Such travel may not, however, have any effect on the amount of light permitted to pass through the iris aperture 42 or the central aperture 14 of the shutter 10 since the iris blades 20 may effectively limit the passage of such light. Thus, it is understood that any travel of the shutter blades 16 beyond the iris aperture 42 may extend the minimum exposure time for the shutter 10. Such an extended exposure time may render the shutter 10 ineffective for certain high-speed applications.

As exemplified by the graph on the left-hand side of FIG. 8, the exemplary shutters 10 of the present disclosure may be configured to reduce the minimum exposure time, particularly for shutters 10 used in applications require relatively small iris openings 42, by limiting the travel of the shutter blades 16 beyond the iris aperture 42. For example, the iris blades 20 of an exemplary shutter 10 may be opened to form an iris aperture 42 of any desirable size. Once the iris aperture 42 has been formed, the shutter blades 16 may be rotated in a first direction to form a shutter aperture 54 that is larger in diameter, surface area, and/or any other metric than the iris aperture 42, such that the shutter blades 16 expose the iris aperture 42. In such an exemplary embodiment, the shutter blades 16 may form the shutter aperture 54 at any intermediate position between an open position and a closed position of the shutter blades 16. In order to minimize the exposure time of such an exemplary shutter 10, it may be desirable to control the shutter blades 16 such that travel of the shutter blades 16 beyond the iris aperture 42 is substantially minimized. Once the shutter blades 16 have been opened to expose the iris aperture 42, the shutter blades 16 may then be rotated in a second direction, opposite the first direction, from the intermediate position to the closed position.

In such an exemplary method, it is understood that rotating the shutter blades 16 in the second direction, opposite the first direction, may be facilitated by sending a control signal to, for example, the actuator 66 configured to control motion of the drive ring 38 and/or the shutter blades 16. Such a control signal may be sent at any time during movement of the shutter blades 16, and in an exemplary embodiment the control signal may be sent before the shutter blades 16 reach the open position. For example, reversing the direction of travel of the shutter blades 16 in this way may be accomplished by reversing an electric current sent to the actuator 66 and/or by reversing a polarity of voltage sent to the actuator 66. In a further exemplary embodiment, one or more current pulses may be sent to the actuator 66 to accelerate, decelerate, and/or change the direction of rotation of the shutter blades 16 and/or the drive ring 38.

In addition, as described above with regard to the exemplary embodiments of FIGS. 4 through 6, in attempting to minimize shutter blade travel and reduce the minimum exposure time for the shutters 10 described herein, movement of at least one of the exemplary shutter components described herein may be limited and/or damped through abutment, impact, and/or contact with one or more of the exemplary stops 34, 36 described herein. For example, at least one of the shutter blades 16 and/or a component of the drive ring 38 may impact the exemplary stops 34, 36 at an intermediate position between the open and closed positions, and the stop 34, 36 may be disposed to minimize travel of the shutter blades 16 beyond the iris aperture 42.

In addition to and/or in place of any of the shutter components discussed herein, an exemplary shutter 10 of the present disclosure may include, among other things, a voice coil configured to impart motion to at least one of the shutter blades 16 and/or the drive ring 38. For example, as illustrated in FIG. 9, an exemplary shutter 10 may include a plurality of shutter blades 16 coupled to the drive ring 38 such that rotation of the drive ring 38 transitions the shutter blades 16 between the open and closed positions. Such an exemplary shutter may also include a voice coil 68 and be disposed proximate at least one permanent magnet 70 and, in an exemplary embodiment, the voice coil 68 may be disposed between a pair of permanent magnets 70, 72. In such an exemplary embodiment, energizing the voice coil 68 may cause the voice coil 68 to move relative to the magnets 70, 72. In such an exemplary embodiment, the voice coil 68 may be carried by at least one moving component of the shutter 10. In a further exemplary embodiment, the voice coil 68 may be coupled to, embedded within, and/or otherwise carried by, for example, the drive ring 38. In such an exemplary embodiment, energizing the voice coil 68 may cause the drive ring 38 and/or the plurality of shutter blades 16 to rotate as desired. Accordingly, in an exemplary embodiment, the actuator 66 discussed above may comprise the voice coil 68/magnet 70, 72 configuration described above.

In an exemplary embodiment, the magnets 70, 72 may be disposed on and/or otherwise connected to, for example, the base plate 12, and the voice coil 68 may travel along a substantially linear and/or a substantially arcuate path extending between the magnets 70, 72. In such an exemplary embodiment, at least the voice coil 68 may be movable with respect to the base plate 38. Accordingly, in such an exemplary embodiment, the voice coil 68 may be controllably, electrically, and/or otherwise operably connected to a controller 26 via one or more flexible leads 74. The flexible lead 74 may be substantially similar to, for example, the cable 22 discussed above with regard to FIG. 2. Alternatively, the flexible lead 74 may comprise one or more strands of copper wiring and/or fiber optic materials configured to transmit signals, electric current, and/or information between the voice coil 68 and the controller 26. For example, the flexible lead 74 may be configured to direct an electric current to the voice coil 68 from the controller 26 and/or a power source (not shown) such as a battery connected thereto. Such a flexible lead 74 may allow for the voice coil 68 to move relative to the base plate 12 while maintaining a direct electrical connection to the controller 26 and/or power source.

In addition, the drive ring 38 of such an exemplary shutter 10 may include, for example, a detent 40 similar to the detent 40 described above with regard to FIG. 4. Such an exemplary shutter 10 may also include a first stop 34, and a second stop 36 disposed opposite the first stop 34. In such an exemplary embodiment, as described above with regard to FIG. 4, the detent 40 of the drive ring 38 may impact the first stop 34 when the shutter blades 16 are in the open position, and may impact the second stop 36 when the shutter blades 16 are in the closed position. Similarly, as described above with regard to FIG. 4, at least one of the stops 34, 36 may be movable relative to the other of the stops 34, 36.

In addition to and/or in place of any of the shutter components described herein, a further exemplary shutter 10 may include a first plurality of shutter blades and a second plurality of shutter blades disposed substantially parallel to the first plurality of shutter blades. Both pluralities of shutter blades may be configured to rotate between a closed position blocking light from passing through the central 14 of the shutter and an open position forming a shutter aperture 54 and permitting light to pass therethrough. The plurality of shutter blades may be disposed facing each other, and each plurality of shutter blades may be disposed and/or otherwise configured to rotate within and/or along planes that are substantially parallel to each other. Such an exemplary embodiment may be structurally similar to, for example, the shutter blade/iris blade embodiments of FIGS. 1 through 3. Such an exemplary shutter 10 may be controlled to expose the central aperture 14 of the shutter 10 for a desired exposure period. This desired exposure period may be lengthened or reduced based on the speed and/or timing of opening and/or closing of the first and/or second plurality of shutter blades.

It is understood that this desired exposure period may be, for example, the period of time for which light is permitted to pass through the shutter 10. In an exemplary embodiment, rotating at least one of the plurality of shutter blades to the open position may expose the central aperture 14 for a first portion of the desired exposure period, and rotating the other plurality of shutter blades to the closed position in order to expose the central aperture 14 for the remainder of the desired exposure. In such an exemplary embodiment, the exposure period may be lengthened by delaying rotation of the first plurality of shutter blades to the closed position and/or by expediting rotation of the second plurality of shutter blades to the open position. In addition, the maximum size of the shutter aperture formed by the first and second plurality of shutter blades in such an exemplary embodiment may be increased by at least one of delaying the first plurality of shutter blades transitioned to the closed position and expediting the rotation of the second plurality of shutter blades to the open position.

The invention has been described in detail with particular reference to a presently preferred embodiment, but it will be understood that variations and modifications can be effected within the spirit and scope of the invention. The presently disclosed embodiments are therefore considered in all respects to be illustrative and not restrictive. The scope of the invention is indicated by the appended claims, and all changes that come within the meaning and range of equivalents thereof are intended to be embraced therein.

The invention claimed is:

1. A shutter, comprising:
   (a) a driver ring;
   (b) a plurality of shutter blades coupled to the drive ring such that movement of the drive ring transitions the plurality of shutter blades between an open position exposing a central aperture of the shutter, and a closed position blocking the central aperture; and
   (c) a first stop and a second stop movable relative to the first stop, at least one of the first and second stops limiting travel of the shutter blades, wherein the drive ring is rotatable about the central aperture, and the at least one of the first and second stops limits travel of the shutter blades via direct contact between the drive ring and the at least one stop.

2. The shutter of claim 1, wherein the drive ring impinges upon one of the first and second stops to limit rotation of the drive ring.

3. The shutter of claim 1, wherein the first stop is movable relative to the second stop.

4. The shutter of claim 1, further comprising an iris ring, and a plurality of iris blades coupled to the iris ring and forming an iris aperture, the iris ring being in communication with an actuation assembly of the shutter configured to selectively change the size of the iris aperture.

5. The shutter of claim 4, wherein the actuation assembly comprises an actuator configured to rotate the iris ring, and wherein rotation of the iris ring changes the size of the iris aperture.

6. The shutter of claim 4, wherein the second stop is coupled to the iris ring such that movement of the iris ring results in movement of the second stop and the iris blades.

7. The shutter of claim 4, further including a sensor coupled to the iris ring such that movement of the iris ring results in movement of the sensor and the iris blades.

8. The shutter of claim 4, wherein the second stop is in communication with a component of the actuation assembly configured to move the iris blades such that movement of the iris blades results in corresponding movement of the second stop.

9. The shutter of claim 1, wherein the second stop comprises a cam rotatable relative to the first stop, and wherein rotation of the cam relative to the first stop changes a range of rotation of the drive ring.

10. The shutter of claim 1, wherein the drive ring is rotatable between a first position in direct contact with the first stop when the shutter blades are in the open position, and a second position in direct contact with the second stop, and isolated from contact with the first stop, when the shutter blades are in the closed position.

11. The shutter of claim 1, the shutter blades having a first range of rotation when rotating from the open position to the closed position while the first stop is in a first position, and the shutter blades having a second range of rotation, different than the first range of rotation, when rotating from the open position to the closed position while the first stop is in a second position different than the first position.

12. The shutter of claim 1, the drive ring having a first range of rotation while the first stop is in a first position, and the drive ring having a second range of rotation, different than the first range of rotation, while the first stop is in a second position different than the first position.

13. The shutter of claim 1, wherein movement of the second stop toward the first stop reduces a range of rotation of the drive ring, and movement of the second stop away from the first stop increases the range of rotation of the drive ring.

14. A method of controlling a shutter, comprising:
   (a) rotating a plurality of iris blades to form an iris aperture, wherein rotation of the plurality of iris blades moves a first stop relative to a second stop; and
   (b) rotating a plurality of shutter blades between an open position exposing the iris aperture formed by the iris blades and a closed position blocking the iris aperture, at least one of the first and second stops limiting travel of the shutter blades without contacting the shutter blades, the shutter blades having a first range of rotation when rotating from the open position to the closed position while the first stop is in a first position, and the shutter blades having a second range of rotation, different than the first range of rotation, when rotating from the open position to the closed position while the first stop is in a second position different than the first position.

15. The method of claim 14, wherein rotating the plurality of shutter blades comprises rotating a drive ring between a first position abutting the first stop and a second position abutting the second stop.

16. The method of claim 15, further comprising rotating the drive ring from the first position abutting the first stop without moving the first stop relative to the second stop.

17. The method of claim 14, wherein rotating the plurality of iris blades comprises rotating an iris ring to which the iris blades are coupled.

18. The method of claim 17, wherein rotating the iris ring causes movement of the first stop relative to the second stop.

19. A shutter, comprising:
   a base plate including a central aperture;
   a drive ring including a detent extending therefrom, the detent rotatable with the drive ring circumferentially about the central aperture;
   a plurality of shutter blades connected to the drive ring and movable, in response to movement of the drive ring, between an open position exposing the central aperture and a closed position blocking the central aperture; and
   a first stop and a second stop movable relative to the first stop, wherein the detent is configured to directly impact one of the first and second stops when the plurality of shutter blades is in the open position, and the other of the first and second stops when the plurality of shutter blades is in the closed position.

20. The shutter of claim 19, further including a first biasing member connected to the detent and biasing the detent toward the first stop, and a second biasing member connected to the drive ring.

21. The shutter of claim 19, wherein the second stop comprises a damper configured to damp motion of the detent upon being impacted by the detent.

22. The shutter of claim 19, further including an iris ring rotatable relative to the base plate, and a plurality of iris blades connected to the iris ring and movable, in response to movement of the iris ring, between an open position exposing an iris aperture and a closed position blocking the iris aperture.

23. The shutter of claim 22, further comprising an actuation assembly including an actuator configured to rotate the iris ring about the iris aperture.

24. The shutter of claim 23, wherein the actuation assembly further includes a linkage coupled to the actuator, and wherein movement of the linkage results in a corresponding movement of the second stop.

25. The shutter of claim 24, wherein the base plate includes a channel, and wherein the linkage is movably disposed within the channel such that the channel guides motion of the linkage along a desired path.

26. The shutter of claim 19, wherein the first and second stops are disposed on a first side of the base plate, the drive ring rotates in direct contact with the first side of the base plate, and the plurality of shutter blades is disposed on a second side of the base plate opposite the first side.

27. The shutter of claim 19, the plurality of shutter blades having a first range of rotation when rotating from the open position to the closed position while the first stop is in a first position, and the plurality of shutter blades having a second range of rotation, different than the first range of rotation, when rotating from the open position to the closed position while the first stop is in a second position different than the first position.

* * * * *